(12) United States Patent
Woodford

(10) Patent No.: US 9,540,905 B2
(45) Date of Patent: Jan. 10, 2017

(54) INJECTION DEVICE

(76) Inventor: Keith Donald Woodford, Aberdeen (GB)

(*) Notice: Subject to any disclaimer, the term of this patent is extended or adjusted under 35 U.S.C. 154(b) by 519 days.

(21) Appl. No.: 14/110,310

(22) PCT Filed: Apr. 5, 2012

(86) PCT No.: PCT/GB2012/000326
§ 371 (c)(1),
(2), (4) Date: Jan. 17, 2014

(87) PCT Pub. No.: WO2012/136966
PCT Pub. Date: Oct. 11, 2012

(65) Prior Publication Data
US 2014/0182855 A1 Jul. 3, 2014

(30) Foreign Application Priority Data
Apr. 7, 2011 (GB) .................................. 1105873.2

(51) Int. Cl.
| *E21B 34/08* | (2006.01) |
|---|---|
| *E21B 34/10* | (2006.01) |
| *E21B 37/06* | (2006.01) |
| *E21B 41/02* | (2006.01) |
| *E21B 43/25* | (2006.01) |
| *F16K 17/04* | (2006.01) |

(52) U.S. Cl.
CPC .............. *E21B 34/08* (2013.01); *E21B 34/10* (2013.01); *E21B 37/06* (2013.01); *E21B 41/02* (2013.01); *E21B 43/25* (2013.01); *F16K 17/044* (2013.01)

(58) Field of Classification Search
CPC .......... E21B 34/08; E21B 34/10; E21B 37/06; E21B 41/02; E21B 43/25; E21B 43/123; F16K 17/044
See application file for complete search history.

(56) References Cited

U.S. PATENT DOCUMENTS 2,241,656 A * 5/1941 Crickmer .............. E21B 43/123
417/115
2,591,528 A   4/1952 Filstrup
(Continued)

FOREIGN PATENT DOCUMENTS

| EP | 0137275 | 4/1985 |
|---|---|---|
| EP | 1225381 | 7/2002 |

(Continued)

*Primary Examiner* — Jennifer H Gay
(74) *Attorney, Agent, or Firm* — John G. Posa; Belzer PC

(57) ABSTRACT

An injection device for use in injecting a fluid into a target location comprises a housing and a valve assembly located within the housing. The housing defines an inlet for communicating with an injection line, an outlet for communicating with a target location, and an injection fluid flow path extending between the inlet and outlet. The valve assembly located is configured to control the flow of injection fluid along the flow path and comprises first and second valve members both arranged to move within the housing, wherein in an open configuration to permit flow the first and second members are disengaged, and in a closed configuration to prevent flow the first and second members are engaged and the first valve member is biased against the second member by inlet fluid pressure to assist sealing therebetween.

25 Claims, 7 Drawing Sheets

(56) References Cited

U.S. PATENT DOCUMENTS

| | | | | |
|---|---|---|---|---|
| 2,994,335 A * | 8/1961 | Dudley | E21B 43/123 | 137/155 |
| 3,225,783 A * | 12/1965 | Stacha | E21B 43/123 | 137/155 |
| 3,410,346 A * | 11/1968 | Garrett | E21B 34/105 | 137/515.5 |
| 3,722,527 A * | 3/1973 | Blackwell | E21B 43/123 | 137/155 |
| 3,824,850 A * | 7/1974 | Nutter | E21B 34/10 | 73/152.23 |
| 4,039,031 A * | 8/1977 | Crowe | E21B 34/063 | 166/317 |
| 4,072,166 A * | 2/1978 | Tiraspolsky | E21B 21/103 | 137/496 |
| 4,399,871 A * | 8/1983 | Adkins | E21B 34/06 | 137/539.5 |
| 4,480,687 A * | 11/1984 | Terral | E21B 23/03 | 166/117.5 |
| 4,620,597 A * | 11/1986 | Lamb | E21B 34/105 | 137/155 |
| 4,766,960 A * | 8/1988 | Williamson, Jr. | E21B 34/06 | 137/493.7 |
| 6,148,920 A * | 11/2000 | McCalvin | E21B 34/06 | 166/324 |
| 6,666,273 B2 * | 12/2003 | Laurel | E21B 21/10 | 166/320 |
| 7,506,690 B2 | 3/2009 | Kelley | | |
| 7,637,324 B2 * | 12/2009 | Anderson | E21B 34/10 | 166/321 |
| 8,347,916 B2 * | 1/2013 | June | E21B 33/038 | 137/613 |
| 9,187,967 B2 * | 11/2015 | McIntosh | E21B 21/106 | |
| 2001/0032675 A1 * | 10/2001 | Russell | F16K 17/18 | 137/493.9 |
| 2009/0008102 A1 * | 1/2009 | Anderson | E21B 34/10 | 166/373 |
| 2010/0101788 A1 * | 4/2010 | Mennem | E21B 43/25 | 166/268 |
| 2010/0193187 A1 * | 8/2010 | Briquet | E21B 49/081 | 166/264 |
| 2011/0067876 A1 * | 3/2011 | Turner | E21B 34/10 | 166/310 |
| 2011/0108279 A1 * | 5/2011 | June | E21B 33/038 | 166/321 |
| 2013/0153239 A1 * | 6/2013 | McIntosh | E21B 21/106 | 166/321 |
| 2013/0180592 A1 * | 7/2013 | He | F16K 15/063 | 137/1 |
| 2014/0182855 A1 * | 7/2014 | Woodford | E21B 34/08 | 166/305.1 |
| 2015/0144352 A1 * | 5/2015 | He | E21B 37/06 | 166/373 |
| 2015/0240601 A1 * | 8/2015 | Woodford | E21B 34/08 | 166/305.1 |

FOREIGN PATENT DOCUMENTS

| | | |
|---|---|---|
| EP | 2103853 | 9/2009 |
| GB | 1129329 | 10/1968 |
| GB | 2279725 | 1/1995 |

* cited by examiner

INJECTION DEVICE

FIELD OF THE INVENTION

The present invention relates to an injection device for use in permitting injection of a fluid into a downhole location.

BACKGROUND TO THE INVENTION

Many well completions include a means of injecting chemicals into the wellbore at a point in the completion for the purposes of corrosion reduction, scale reduction, hydrate reduction, well stimulation, a variety of optimisation strategies or the like. A typical installation will include a chemical injection line which is run from a surface chemical injection pump system, alongside a production tubing to terminate at a downhole location to permit a chemical injected from surface to be dosed into the production tubing, formation or other desired location.

The fluid within the injection line will be subject to hydrostatic pressure, which can often be significant in deeper wells. If this hydrostatic pressure should exceed the pressure within the production tubing (which may occur in a depleting wellbore, a wellbore subject to artificial lift or the like), in addition to any other associated resistance to the injection fluid, then the result can be the undesirable flow or cascading of injection fluid into the production tubing. This effect may be termed "hydrostatic fail-through". If unchecked such hydrostatic fall-through will occur until the hydrostatic pressure within the injection line is in equilibrium with the production tubing pressure and other flow resistance. If the injection fluid is not continuously replenished during such cascading flow, which may be the case when injection pumps are inoperative, then the result will be the creation of a vacuum in the upper region of the injection line. Such a vacuum may present the injection line to adverse mechanical forces and stresses, such as radial collapse forces. Furthermore, the established vacuum may be defined by a pressure which is lower than the vapour pressure of the injection fluid, thus causing the injection fluid to boil. This may be compounded by the effect of the increased temperatures associated with wellbore environments.

The consequence of vacuum occurrence in chemical injection lines is that the original fluid may not be able to retain its intended state and the fluid carrier will boil off. This has the potential of many adverse effects, such as solid depositing, viscosity change, crystal formation, waxing, partial or full solidification and the like.

In order to address the problems defined above it is known in the art to utilise an appropriate injection valve near the point of injection into the production tubing, wherein the valve seeks to maintain a positive pressure within the full height of the injection line. A known injection valve includes a housing with a valve assembly which adjustably permits flow from an inlet to an outlet. Flow is initiated when the inlet pressure exceeds a threshold, and during flow the valve defines a flow restriction which establishes a back pressure on the inlet side and hence within the injection line.

A portion of a known injection valve 1 is shown in FIG. 1. A housing 2 defines an inlet 3 and an outlet 4 and a valve assembly 5 is positioned therebetween. The valve assembly includes a ball 6 which is arranged to cooperate with a seat 7, wherein flow is prevented when the ball 6 is engaged with the seat 7 and permitted when disengaged. When the ball 6 is closed against the seat 7 inlet pressure will act over the defined ball/seat sealing area 8 thus applying a force in a direction to lift the ball 6 from the seat 7, whereas outlet pressure will act over the sealing area 8 on an opposite side thus applying a force in a direction to engage the ball 6 against the seat 7. The known injection valve 1 includes a spring member 9 which applies a bias force against the ball 6 in a direction to close the ball 6 against the seat 7. Appropriate selection of the spring force may permit an appropriate resistance backpressure rating of the device 1 to be achieved.

The net force applied on the ball may be expressed by:

$$F_N = F_{IP} - (F_{OP} + F_S)$$

wherein: $F_N$=net force
$F_{IP}$=force generated over seal area 24 by inlet pressure
$F_{OP}$=force generated over seal area 24 by outlet pressure
$F_S$=spring force At all times the force generated by the inlet pressure $F_{IP}$ will be acting to disengage the ball 6 from the seat 7. Accordingly, for flow to occur the net force $F_N$ must be positive in that the value of the force generated by inlet pressure $F_{IP}$ must be greater than the sum of the force generated by outlet pressure and the spring ($F_{OP}+F_S$). During flow the ball 6 will continuously adjust to seek force equilibrium, thus functioning to modify the restriction to flow between the ball 6 and seat 7 and regulate flow which inherently permits a positive pressure to be maintained within the injection line. This positive pressure will be a function of the spring force $F_S$.

When the sum of outlet pressure force and spring force ($F_{OP}+F_S$) exceeds the inlet pressure force $F_{IP}$ the ball 6 will be moved in a direction to engage the seat 7, with the expectation that a seal will occur upon engagement. However, at the instant when the combined forces generated by the outlet pressure and spring ($F_{OP}+F_S$) exceed the force generated by the inlet pressure $F_{IP}$, the force differential or net force $F_N$ acting to close and maintain the ball 6 in sealing engagement with the seat 7 will be extremely small. Such a low force may be insufficient to prevent leakage, particularly where the surfaces of the ball 6 and seat 7 have become contaminated. Such leakage may result in reducing pressure within the injection line and possible creation of a vacuum, which is to be avoided.

Furthermore, as fluid pressure acts over the sealing area 8 to facilitate movement of the ball 6, then in order to generate sufficient forces the area 8 must be relatively large. The provision of such a large area may present problems, for example by making it difficult to create a seal over such a large area when required. To accommodate sealing very precision components must be utilised which may be expensive. Furthermore, a larger sealing area will result in a potentially larger flow area when the ball 6 is lifted from the seat 7, which may lead to the sensitivity issues in that a very large range of flow rates will occur over only a very minute range of movement of the ball 6 relative to the seat 7.

Also, a larger sealing area may become more susceptible to contamination.

Pressure sensitive equipment, such as the known injection valve 10 described above, is typically installed with a degree of protection which isolates sensitive components of the equipment from wellbore pressure and conditions until installation is completed. Such protection may include burst disks or rupture cartridges. However, when such protective components are eventually ruptured by elevated pressures a flow surge can be created which may cause the ball 6 to be aggressively lifted from and re-engaged with the seat 7 resulting in possible damage. The ball 6 and/or seat 7 are typically formed from brittle materials, such as sapphire, ruby, ceramics, carbides, hard metals or the like which may shatter during such a surge event.

SUMMARY OF THE INVENTION

According to a first aspect of the present invention there is provided an injection device for use in injecting a fluid into a target location, comprising:

a housing defining an inlet for communicating with an injection line, an outlet for communicating with a target location, and an injection fluid flow path extending between the inlet and outlet; and a valve assembly located within the housing and configured to control the flow of injection fluid along the flow path, wherein the valve assembly comprises first and second valve members both arranged to move within the housing, wherein in an open configuration to permit flow the first and second members are disengaged, and in a closed configuration to prevent flow the first and second members are engaged and the first valve member is biased against the second member by inlet fluid pressure to assist sealing therebetween.

The valve assembly may be configured to maintain fluid pressure at the inlet side of the valve assembly above fluid pressure at the outlet side of the valve assembly In at least one mode of operation the valve assembly may function to maintain the inlet fluid pressure above the outlet fluid pressure. This may assist to prevent or minimise the risk of an associated injection line in communication with the inlet from being exposed to a negative pressure.

The present invention permits the use of inlet pressure to assist sealing between the first and second valve members when in the closed configuration, as noted above. Inlet pressure may be permitted to establish a bias force on the first valve member to assist sealing by virtue of the fact that the first valve member is moveable within the housing. As such, the effects of the inlet fluid pressure may be experienced by the first valve member, which would otherwise not be the case if the first valve member were fixed.

The use of inlet pressure to assist sealing may permit improved sealing to be achieved upon engagement of the first and second valve members minimising the risk of leakage therebetween. This in turn may, in some applications, minimise the possibility of an associated injection line in communication with the housing inlet being exposed to vacuum or negative pressure conditions, for example due to hydrostatic fall-through.

The injection device may be configured for use in injection into a wellbore target location. The target location may be associated with wellbore equipment or infrastructure. The target location may be associated with production tubing or equipment.

The inlet fluid pressure within the injection device may be at least partially defined by fluid pressure within an associated injection line. The outlet fluid pressure may be at least partially defined by fluid pressure at an associated target location.

The valve assembly may be opened when the pressure differential between inlet and outlet exceeds a predetermined value, and closed when the pressure differential between the inlet and outlet falls below a predetermined value. Thus, when the inlet pressure reduces, for example during ceased injection (which may be established by deactivating an injection pump), the first and second valve members may become engaged to prevent flow, with inlet pressure then assisting sealing therebetween. Conversely, when the inlet pressure increases, for example when injection is initiated (which may be achieved by activating an injection pump), the first and second valve members may disengage to permit flow.

The valve assembly may be configured such that the first and second valve members define a restriction to flow when disengaged. This may establish a back pressure in the inlet side assisting to maintain the inlet pressure above the outlet pressure. The degree of separation between the first and second valve members may be adjustable to adjust the restriction to flow. The degree of separation may be adjusted automatically to maintain the inlet pressure above outlet pressure. Such automatic adjustment may be achieved by the desire for the valve assembly to continuously satisfy force equilibrium. In such a case force equilibrium may permit the desired pressure differential to be maintained. As such, any imbalance, for example due to changing inlet and outlet pressures or flow rate will be automatically adjusted for.

The second valve member may be configured to support the first valve member when engaged therewith. In such an arrangement movement of the second valve member when engaged with the first valve member will result in movement of both members. This arrangement may permit the valve assembly to remain closed in the event of such collective movement of the valve members. This may assist to regulate or minimise the effects of spurious or undesired pressure fluctuations which may otherwise cause inadvertent disengagement of the members. Such undesired pressure fluctuations may be transitory or fleeting and not intended to represent operational pressure fluctuations. For example, transitory pressure fluctuations may be created by flow surges.

The first valve member may be located on an inlet side of the valve assembly, and the second valve member may be located on an outlet side of the valve assembly. Accordingly, the first valve member may be located in an upstream position and the second valve member may be located in a downstream position. This arrangement may facilitate use of inlet fluid pressure to bias the first valve member against the second valve member.

Each valve member may define an engagement surface configured to be mutually engaged when the valve assembly is in a closed configuration. Each engagement surface may define a sealing surface.

The first and second valve members may define a seal area at the region of engagement. When the first and second valve members are engaged inlet fluid pressure may act on one side, which may be defined as an upstream side of the seal area. The bias force acting on the first valve member may therefore be a function of the seal area and the inlet pressure. Outlet fluid pressure may act on an opposite side of the seal area, which may be defined as a downstream side. The outlet pressure may define a force acting on the first valve member which is a function of the seal area and the outlet pressure. In this arrangement the first valve assembly may be biased by the effect of a pressure differential between inlet and outlet pressures.

The apparatus may comprise a limiting arrangement configured to limit or restrict movement of the first valve member. The limiting arrangement may be configured to limit movement of the first valve member during opening of the valve assembly. The limiting arrangement may be arranged to limit movement of the first valve member at a point of limitation and permit the second valve member to move beyond the point of limitation and to become disengaged from the first valve member. The limiting arrangement may be fixed relative to the housing.

The limiting arrangement may comprise a tether.

The limiting arrangement may comprise a land region configured to be engaged by the first valve member when at a point of limitation.

The limiting arrangement may comprise a no-go. The limiting arrangement may comprise a shoulder arrangement. The limiting arrangement may comprise an elongate member. The elongate member may extend through the second valve member.

The valve assembly may comprise a biasing arrangement configured to bias the first valve member in a desired direction. The biasing arrangement associated with the first valve member may be configured to bias said member in a direction towards engagement with the second valve member. Such a biasing arrangement may assist sealing between the valve members when engaged. The biasing arrangement associated with the first valve member may comprise one or more springs, such as a coil spring, wave spring, flat spring or the like. The biasing arrangement may comprise a deformable member capable of elastic recovery, such as an elastic body subject to deformation, for example compression.

The second valve member may define an actuation member which is actuated to reconfigure the valve assembly between open and closed positions. The second valve member may be positively actuated to move to engage and disengage the first valve member. Actuation may be achieved by at least one of a pressure originating force and mechanically originating force.

The first valve member may define a passive member configured to be engaged and disengaged by the second valve member when said second member is actuated to move. The first valve member may be configured to float within the housing. The first valve member may define a floating degree of freedom. The first valve member may be configured to float in a direction associated with, for example aligned with, a centreline of the second valve member.

The second valve member may comprise or define a piston arrangement configured to be actuated by fluid pressure to move said second valve member. The piston arrangement may be exposed to inlet fluid pressure on one side and outlet fluid pressure on an opposing side. The piston arrangement may define a common sealing area which isolates inlet and outlet pressure. Accordingly, any net pressure force may be provided by pressure differential.

The piston arrangement may be remote from the point of engagement or sealing area defined between the first and second valve members. Accordingly, the piston arrangement may be appropriately sized to provide a desired pressure originating force to manipulate, move or actuate the second valve member. In this way any required contribution to the actuation force via the engagement or sealing area may be minimised such that said area may be permitted to be reduced. Such a reduction in the sealing area may minimise issues associated with contamination, the requirement to use expensive components and the like. Furthermore, the ability to utilise a smaller engagement or sealing area may increase the sensitivity of the valve assembly in use. For example, the smaller sealing area may present a more sensitive control over the separation of the first and second valve members and associated control of back pressure.

The piston arrangement may be at least partially defined by an annular structure, which may be an integral or separate and connected part of the second valve member.

The piston arrangement may be defined by a seal area associated with the second valve member. The seal area may be larger than any seal area associated with the region of engagement between the first and second valve members.

The valve assembly may comprise a biasing arrangement configured to bias the second valve member in a desired direction. The biasing arrangement may be bias the second valve member to move in a direction to close the valve assembly. The biasing arrangement may be selected to provide a desired biasing force. The biasing force may be selected to define a pressure differential between the inlet and outlet pressures. The second valve member may be configured to be actuated to move in a direction to close the valve assembly by a combination of biasing force from a biasing arrangement and an outlet pressure force acting on an associated piston arrangement. The second valve member may be configured to be actuated to move in a direction to open the valve assembly by an inlet pressure force acting on the associated piston arrangement. The biasing arrangement associated with the second valve member may comprise one or more springs, such as a coil spring, wave spring, flat spring or the like. The biasing arrangement may comprise a deformable member capable of elastic recovery, such as an elastic body subject to deformation, for example compression.

One of the first and second valve members may define a valve seat member and the other of the first and second members may define a valve body member. The valve seat member may define a valve seat which is engaged by the valve body member.

The valve body member may comprise a pin. The valve body member may comprise a ball. The valve body member may comprise a disk, plug, plunger or the like.

One or both of the valve members may define an internal bore configured to accommodate flow of injection fluid therethrough. One or both of the valve members may define a bore configured to define part of the injection fluid flow path within the housing.

One or both of the members may be moveable in reverse directions. The valve members may be moveable in the same direction. One or both of the valve members may be moveable in a direction along the flow path.

The injection device may comprise a pressure rated frangible arrangement configured to rupture upon exposure to a predetermined pressure. The frangible arrangement may be located within the housing. The frangible arrangement may be located on the inlet or upstream side of the valve assembly. The frangible arrangement may be configured to isolate the valve assembly from inlet pressure until required. The frangible arrangement may comprise a burst disk arrangement, rupture cartridge or the like.

The injection device may comprise a surge protection arrangement configured to provide protection against surging flow within or through the housing. Such surging flow may be caused by a particular pump duty cycle, rupturing of a frangible arrangement or the like. The surge protection arrangement may be configured to provide protection to the valve assembly. The surge protection arrangement may be located within the housing. The surge protection arrangement may be located on the inlet or upstream side of the valve assembly.

The surge protection arrangement may comprise a component defining a flow path, wherein the flow path is restricted in the event of surging flow. The flow path may be restricted by being partially or fully closed. The surge protection arrangement may be biased towards a condition in which the flow path is open, and moved against said bias during surging flow. The magnitude of the bias may define the surge rating of the surge protection arrangement. The surge protection arrangement may comprise a spring configured to bias the surge protection arrangement towards a condition in which the flow path is open.

The surge protection arrangement may comprise first and second members, wherein at least one member defines a flow path and relative movement of the first and second members during surging flow restricts said flow path. A biasing member, such as a spring member may be provided between the first and second members and arranged to bias said members to maintain the flow path open. Accordingly, surging flow may act against the bias of the biasing member.

One or both of the first and second members may comprise a sleeve.

The injection device may comprise a filter arrangement configured to filter injection fluid. The filter arrangement may be mounted within the housing. The filter arrangement may be located on the inlet or upstream side of the valve assembly.

The filter arrangement may comprise at least one filter medium such as a screen, mesh, porous element, sintered porous element, membrane or the like. The filter medium may be configured to filter by the mechanism of size exclusion.

The filter arrangement may be fixed relative to the housing. A filter medium may be fixed relative to the housing.

The filter arrangement may facilitate fluid bypass in the event of clogging, thus permitting flow to be maintained. The filter arrangement may comprise a displaceable member which is displaced to permit fluid bypass, for example to permit fluid to bypass at least one filter medium, upon generation of inlet pressure which exceeds a predetermined value. Such inlet pressure may increase when exposed to increased restriction from the filter medium, for example due to clogging. The displaceable member may carry or support at least one filter medium.

The displaceable member may be biased by a biasing arrangement, such as a spring, wherein the displaceable member is displaced against said bias. Accordingly, the biasing arrangement may be selected to define the desired predetermined value of inlet pressure which initiates bypass.

The biasing arrangement associated with the displaceable member of the filter arrangement may also function as a biasing member associated with the first valve member.

The injection device may comprise at least one check valve configured to prevent flow along the injection fluid flow path in a direction from the outlet to the inlet. Such an arrangement may eliminate the risk of flow reversal, for example in the event of outlet pressure exceeding inlet pressure. At least one check valve may be located on an outlet or downstream side of the valve assembly.

According to a second aspect of the present invention there is provided a method of controlling injection flow through an injection device between an injection line and a target location, wherein the injection device includes a housing defining a flow path extending between an inlet and an outlet and a valve assembly comprising first and second moveable valve members located within the housing, the method comprising:

disengaging the first and second valve members to permit flow along the flow path;

engaging the first and second valve members to prevent flow; and biasing the first valve member against the second valve member when engaged therewith with inlet fluid pressure to assist sealing between said members.

The method may comprise the use of the injection device according to the first aspect. Accordingly, features and their defined and implied methods of use presented in accordance with the first aspect may apply to the method according to the second aspect.

According to a third aspect of the present invention there is provided an injection device for use in injecting a fluid into a target location, comprising:

a housing defining an inlet for communicating with an injection line, an outlet for communicating with a target location, and an injection fluid flow path extending between the inlet and outlet; and a valve assembly located within the housing and configured to control the flow of injection fluid along the flow path, wherein the valve assembly comprises first and second valve members configured to be engaged to prevent flow and disengaged to permit flow, wherein at least one of the valve members defines a piston arrangement provided separately from the region of engagement between the first and second valve members and configured to be actuated by fluid pressure to move at least one of said valve members.

The piston arrangement may be defined by a seal area associated with at least one of the first and second valve members. The seal area may be larger than any seal area associated with the region of engagement between the first and second valve members.

Various features defined in relation to the first aspect may be associated with the third aspect.

According to a fourth aspect of the present invention there is provided an injection device for use in injecting a fluid into a target location, comprising:

a housing defining an inlet for communicating with an injection line, an outlet for communicating with a target location, and an injection fluid flow path extending between the inlet and outlet;

a valve assembly located within the housing and configured to control the flow of injection fluid along the flow path; and a surge protection arrangement configured to provide protection against surging flow through the housing.

The surge protection arrangement may comprise a component defining a flow path, wherein the flow path is restricted in the event of surging flow. The flow path may be restricted by being partially or fully closed. The surge protection arrangement may be biased towards a condition in which the flow path is open, and moved against said bias during surging flow. The magnitude of the bias may define the surge rating of the surge protection arrangement. The surge protection arrangement may comprise a spring configured to bias the surge protection arrangement towards a condition in which the flow path is open.

The surge protection arrangement may comprise first and second members, wherein at least one member defines a flow path and relative movement of the first and second members during surging flow restricts said flow path. A biasing member, such as a spring member may be provided between the first and second members and arranged to bias said members to maintain the flow path open. Accordingly, surging flow may act against the bias of the biasing member.

One or both of the first and second members may comprise a sleeve.

Various features defined in relation to the first aspect may be associated with the fourth aspect.

According to a fifth aspect of the present invention there is provided an injection device for use in injecting a fluid into a target location, comprising:

a housing defining an inlet for communicating with an injection line, an outlet for communicating with a target location, and an injection fluid flow path extending between the inlet and outlet;

a valve assembly located within the housing and configured to control the flow of injection fluid along the flow path; and a filter arrangement configured to filter injection fluid and permit fluid bypass in the event of clogging.

The filter arrangement may be mounted within the housing. The filter arrangement may be located on the inlet or upstream side of the valve assembly.

The filter arrangement may comprise at least one filter medium such as a screen, mesh, porous element, sintered porous element, membrane or the like. The filter medium may be configured to filter by the mechanism of size exclusion.

The filter arrangement may be fixed relative to the housing. A filter medium may be fixed relative to the housing.

The filter arrangement may comprise a displaceable member which is displaced to permit fluid bypass, for example to permit fluid to bypass at least one filter medium, upon generation of inlet pressure which exceeds a predetermined value. Such inlet pressure may increase when exposed to increased restriction from the filter medium, for example due to clogging. The displaceable member may carry or support at least one filter medium.

The displaceable member may be biased by a biasing arrangement, such as a spring, wherein the displaceable member is displaced against said bias. Accordingly, the biasing arrangement may be selected to define the desired predetermined value of inlet pressure which initiates bypass.

The biasing arrangement associated with the displaceable member of the filter arrangement may also function as a biasing member associated with the first valve member.

Various features defined in relation to the first aspect may be associated with the fifth aspect.

In the various aspect defined above an injection line and/or a target location may form part of the invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
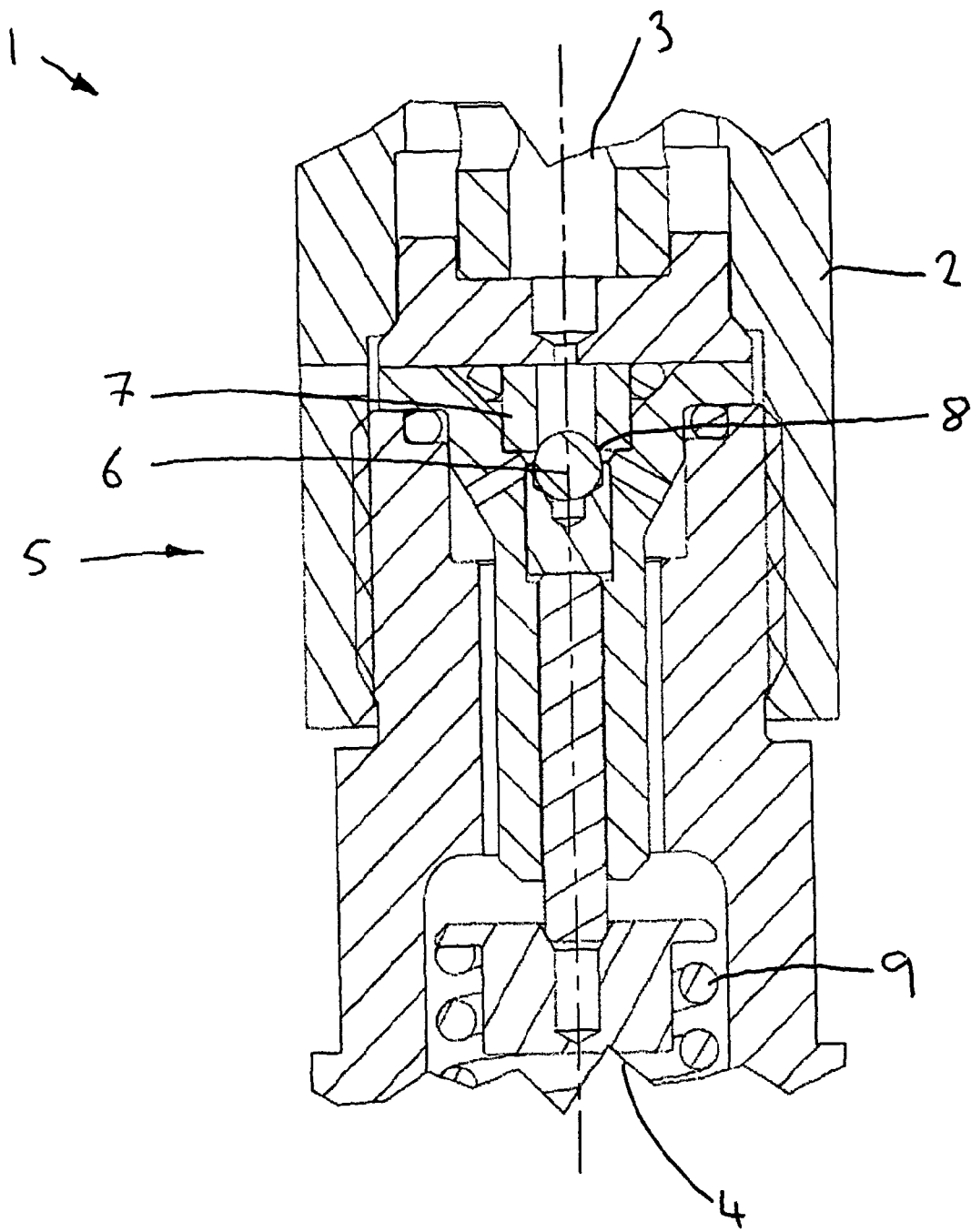
FIG. 1 illustrates a portion of a known injection valve.
Figure 2:
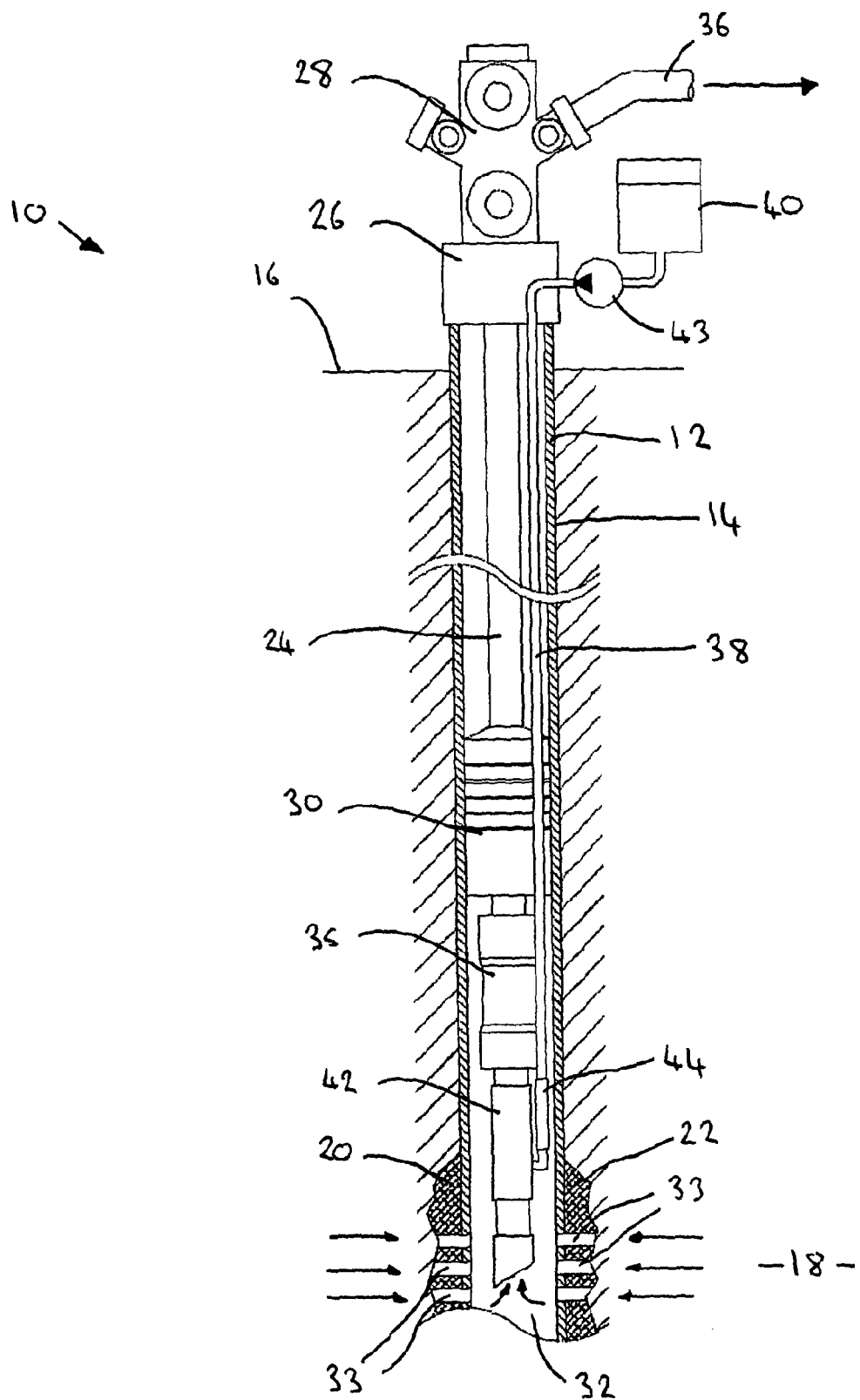
FIG. 2 provides a diagrammatic cross-sectional illustration of a wellbore including an injection line.

A diagrammatic wellbore arrangement is illustrated in FIG. 2. The wellbore, generally identified by reference numeral 10, comprises a casing string 12 which extends through a drilled bore 14 which extends from surface 16 to intercept a hydrocarbon bearing formation 18. A lower annulus area 20 defined between the casing 12 and bore 14 may be filled with cement 22 for purposes of support and sealing. A production tubing string 24 extends into the casing 12 from a wellhead 26 and production tree 28. A lower end of the production tubing string 24 is sealed against the casing 12 with a production packer 30 to isolate a producing zone 32. A number of perforations 33 are established through the casing 12 and cement 22 to establish fluid communication between the casing 12 and the formation 18. Hydrocarbons may then be permitted to flow into the casing 12 at the producing zone 32 and then into the production tubing 24 via inlet 34 to be produced to surface. Artificial lift equipment, such as an electric submersible pump (ESP) 35 may optionally be installed inline with the production tubing 24 as part of the completion to assist production to surface. The production tree 28 may provide the necessary pressure barriers and provides a production outlet 36 from which produced hydrocarbons may be delivered to a production facility (not shown), for example.

An injection line or conduit 38 runs alongside the production tubing 24 from a surface located injection fluid source 40 to a downhole target location, which in the illustrated embodiment is a location along the production tubing 24 defined by an injection mandrel 42 (although the mandrel 42 is optional). An injection pump 43 is located at a topside location to facilitate injection of the injection fluid 40. An injection device 44 is located in a lower region of the injection line 38 and functions to maintain a positive pressure within the injection line 38. This device 44 may therefore minimise the risk and associate problems of hydrostatic fall-through of injection fluid, which may become more significant by the presence of the ESP 35 which can effectively lower the pressure within the production tubing 24 at the point of injection. The injection fluid may comprise a treatment chemical or the like.

Figures 3A, 3B:
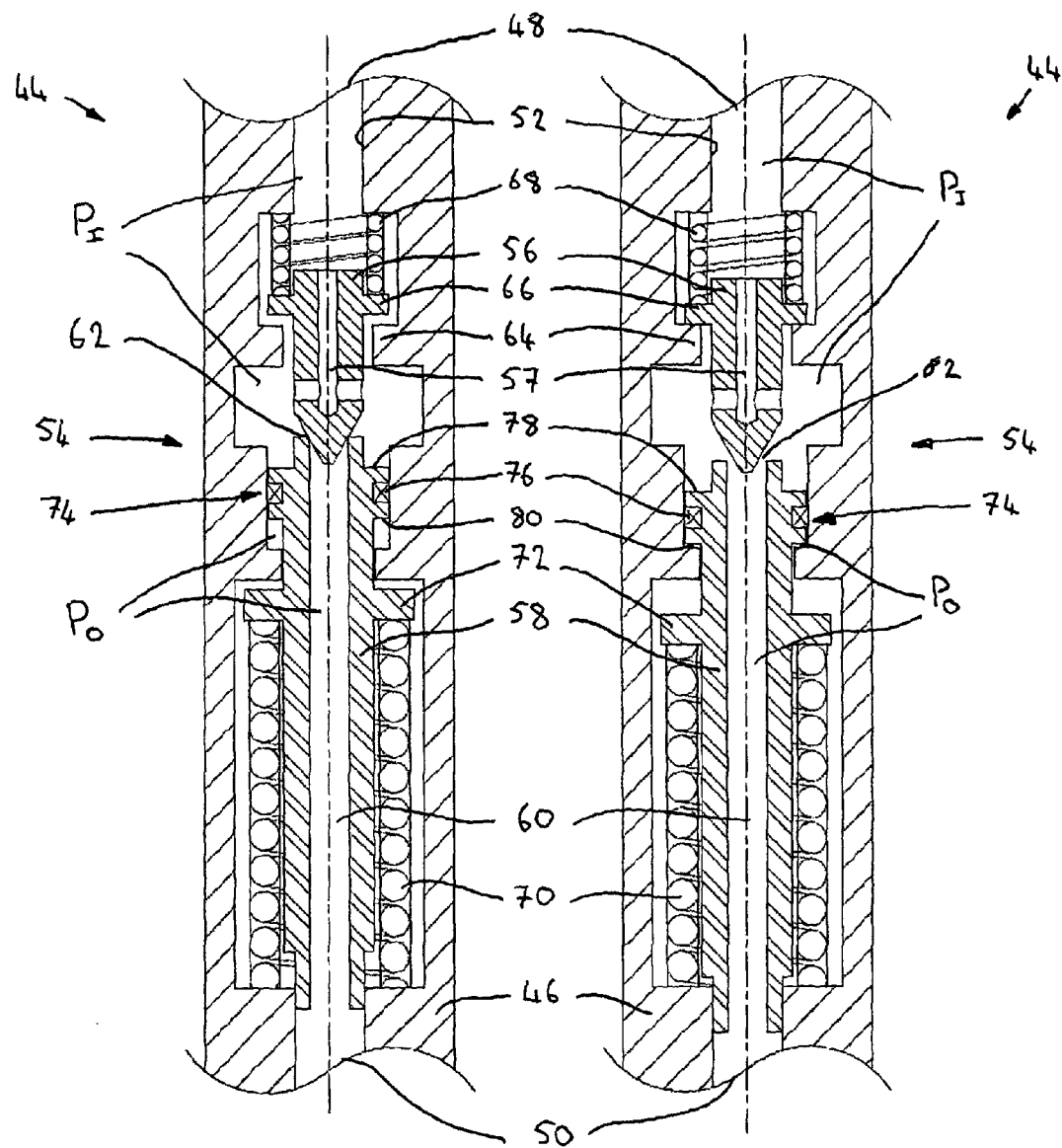
FIG. 3A provides a cross-sectional illustration of a portion of an injection device in accordance with an embodiment of the present invention, shown in a closed configuration.
FIG. 3B shows the device of FIG. 3A in an open configuration.

An example of an injection device 44 in accordance with an embodiment of the present invention is shown in FIGS. 3A and 3B, reference to which is now made, wherein the device 44 is shown in a closed configuration in FIG. 3A and in an open configuration in FIG. 3B. It should be noted that only a portion of the injection device 44 is illustrated in FIGS. 3A and 3B for clarity. The device 44 includes a housing 46 which defines an inlet side 48 for communicating with the injection line 38 (FIG. 2) and an outlet side 50 for communicating with the target location 42 (FIG. 2), with an injection fluid flow path 52 formed therebetween. As will become apparent from the following description, the flow path 52 is defined by a number of different components of the injection device 44 and is not entirely defined by the housing 46. It should also be noted that although the housing 46 has been illustrated as a single component, the housing 46 may in fact be formed from a number of different components or modules.

The injection device 44 further comprises a valve assembly 54 located within the housing 46. As will become apparent from the description below, the valve assembly 54 is configured to control the flow of injection fluid along the flow path 52 to maintain an associate injection line 38 (FIG. 2) in positive pressure.

The valve assembly 54 comprises first and second valve members 56, 58 which are both arranged for movement within the housing 46. In the embodiment shown the first valve member 56 is provided in the form of a pin and defines a valve body member, and the second valve member 58 is provided, generally, in the form of a cylinder and defines a valve seat member. Flow may be permitted to flow around the first valve member 57, and/or a flow path 57 may be provided through the member 56 to accommodate flow. The second valve member 58 defines a flow path 60 therethrough which forms part of the flow path 52 through the housing 46. When the first and second valve members 56, 58 are engaged, as illustrated in FIG. 3A, the valve assembly 54 is configured to be closed to prevent flow through the flow path 52 (57, 60). When the first and second valve members 56, 58 are engaged a seal area 62 is defined.

The valve assembly 54 includes a limiting arrangement which is configured to limit movement of the first valve member 56. Specifically, the device 44 includes a limiting feature 64 fixed relative to the housing 46, and a corresponding limiting feature 66 fixed relative to the first valve member 56. In the arrangement shown in FIG. 3A when the first and second valve members 56, 58 are engaged, the corresponding limiting features 64, 66 are separated such that inlet fluid pressure $P_I$ may act over the seal area 62 thus forcing the first and second valve members 56, 58 together to assist sealing therebetween.

Furthermore, an optional spring 68 is provided which also acts to bias the first valve member 56 against the second valve member 58.

An actuator spring 70 is provided which acts on the second valve member 58, via annular lip 72, to bias said member 58 in a direction to engage the first valve member 56. Furthermore, the second valve member 58 defines a piston arrangement 74 which is sealed relative to the housing 46, in the present embodiment using a seal 76, wherein an upstream side 78 is exposed to inlet fluid pressure $P_I$, and a downstream side 80 is exposed to outlet fluid pressure $P_O$. Accordingly, a net pressure force will be applied on the second valve assembly 58 in accordance with any differential between inlet and outlet pressures $P_I$, $P_O$. As the second valve member 58 is arranged to be actuated by various forces (pressure and spring forces), said member 58 may be defined as an actuator member.

Movement of the second valve member 58 is initiated to disengage the valve members 56, 58, to configure the valve assembly 54 in an open position to permit flow through the flow path 52 (57, 60), as illustrated in FIG. 3B. Such movement is initiated when the inlet pressure $P_I$ is of a sufficient magnitude to apply a force on the piston arrangement 74 to overcome the corresponding force applied by outlet pressure $P_O$ in addition to the force applied by the spring 70. In the present embodiment as the seal 76 presents a common area on both sides of the piston arrangement 74 such that the second valve member 58 will be moved in a direction to open the valve assembly 54 when the inlet pressure $P_I$ exceeds the outlet pressure $P_O$ by an amount proportional to the force of the spring 70. Accordingly, the pressure rating of the injection device 44 may be set in accordance with the spring 64. It is recognised that a compression spring will generate a return force which is proportional to the length of compression. However, in typical operations the magnitude of compression of the spring may be considered to be sufficiently small that the change in spring force may be negligible. However, in other operations with large spring compression this may be accounted for.

During initial movement of the second valve member 58, both members 56, 58 will remain engaged by virtue of inlet pressure $P_I$ acting over seal area 62, in addition to the action of the spring 68. Engagement will persist until the corresponding limiting features 64, 66 are brought together, thus permitting further movement of the second valve member 58 to cause disengagement, as shown in FIG. 3B. Such disengagement defines a flow passage 82 between the first and second members 56, 58, wherein the flow passage provides a restriction to flow. This restriction therefore establishes a back pressure on the inlet side, thus functioning to maintain the inlet pressure $P_I$ above the outlet pressure $P_O$. Further, due to the effect of the piston arrangement 74 and actuator spring 70 the flow passage 82 will be continuously adjusted to maintain the inlet pressure $P_I$ a defined magnitude higher than the outlet pressure $P_O$. The pressure differential will be provided as a function of the spring force. This may assist to eliminate problems associated with, for example, hydrostatic fall-through of injection fluid. Further, this may permit a regulated flow rate or injection rate to be achieved. For example, flow rate may be maintained at a substantially constant rate irrespective of inlet and out pressures, for example.

When inlet pressure $P_I$ drops below a sustainable magnitude, the valve assembly 54 will be caused to close once again, with inlet pressure $P_I$ acting over the seal area 62 to assist with sealing, thus minimising the risk of leakage and any problems associate therewith, such as hydrostatic fall-through of injection fluid.

It should be noted that the differential effect of inlet and out pressures $P_I$, $P_O$ to apply a motive force to the second valve member 58 is primarily presented over the piston arrangement 74 (or more accurately over the area of the seal 76) which is provided remotely from the seal area 62 defined between the members 56, 58 when engaged. As such, the piston arrangement 74 and seal 76 may be appropriately dimensioned to achieve the require actuation forces, such that the seal area 62 may be minimised. This may assist to enable a better seal to be achieved, and also to permit smaller components to be utilised.

Figures 4A, 4B:
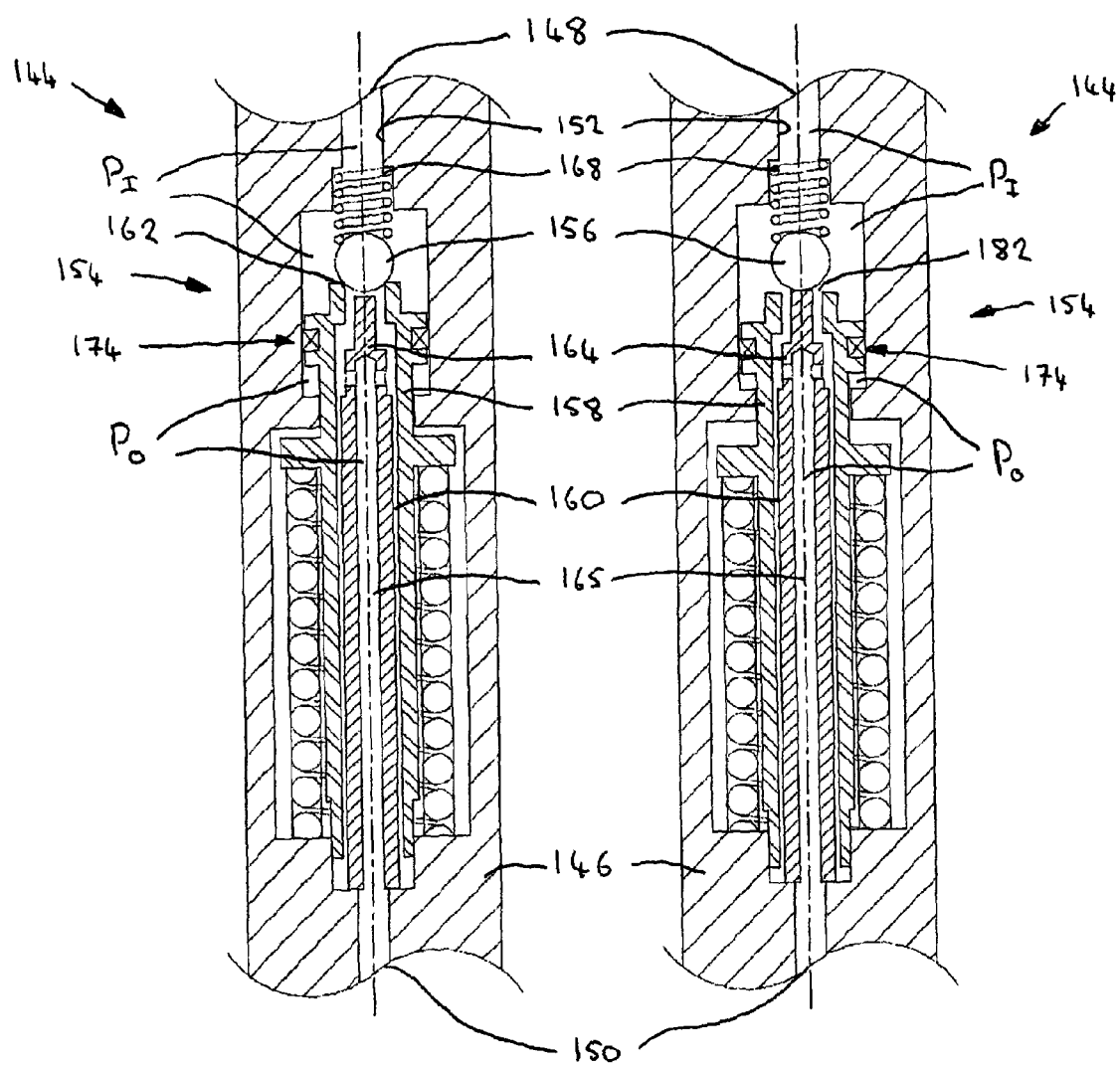
FIG. 4A provides a cross-sectional illustration of a portion of an injection device in accordance with an alternative embodiment of the present invention, shown in a closed configuration.
FIG. 4B shows the device of FIG. 4A in an open configuration.

Reference is now made to FIGS. 4A and 4B in which there is shown a cross-sectional view of a portion of an injection device 144 in accordance with an alternative embodiment of the present invention. The device 144 is shown in an open configuration in FIG. 4A, and in a closed configuration in FIG. 4B. The device 144 is similar to device 44 first shown in FIG. 3A and as such like features share like reference numerals, incremented by 100. Furthermore, as the structure and operation of device 144 is similar to device 44, only the differences will be highlighted in the interest of brevity. Thus, the device 144 includes a valve assembly 154 having first and second valve members 156 158, wherein the first valve member 156 is provided in the form of a ball. A limiting element in the form of an elongate rod 164 having a central flow path 165 extends through the bore 160 of the second valve member 158 and is fixed relative to housing 146.

When the valve assembly 154 is closed, as shown in FIG. 4A, the first and second valve members 156, 158 are engaged and a seal area 162 is defined with inlet pressure $P_I$ acting over the seal area 162 to bias the first valve member 156 against the second valve member 158 to assist sealing. A spring 168 also contributes in this regard.

When a sufficient inlet pressure $P_I$ exists the second valve member 158 will be caused to move, along with the engaged first valve member 156 until said member 156 contacts or lands on the elongate rod 164, thus permitting separation of the members 156, 158 and creation of a flow passage 182, as illustrated in FIG. 4B.

Figures 5A, 5B:
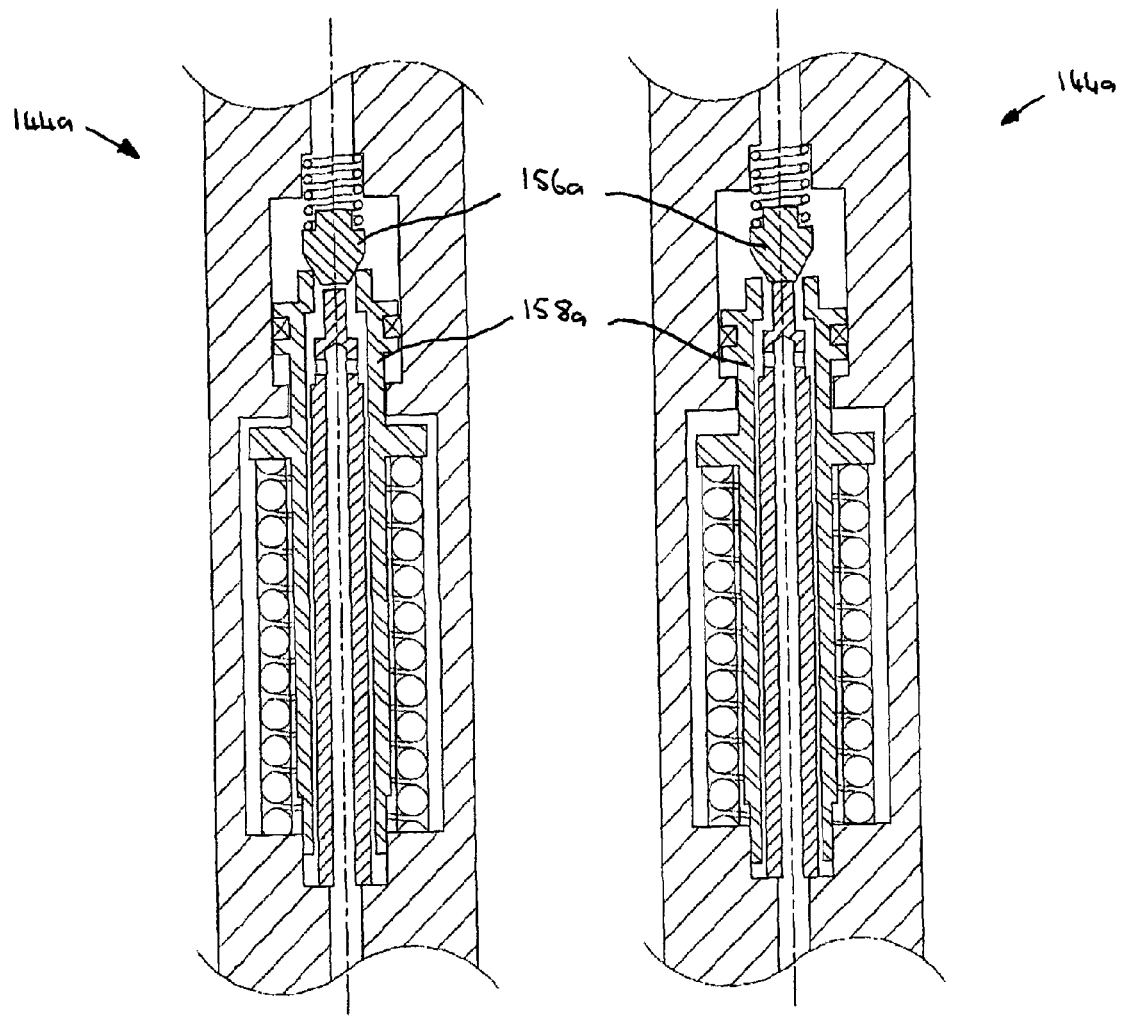
FIG. 5A provides a cross-sectional illustration of a portion of an injection device in accordance with a further alternative embodiment of the present invention, shown in a closed configuration.
FIG. 5B shows the device of FIG. 5A in an open configuration.

In the embodiment illustrated in FIGS. 4A and 4B the first valve member is provided in the form of a ball 156. However, and as illustrated in FIGS. 5A and 5B, an injection device 144a in accordance with an alternative embodiment may comprise a pin 156a. The various features associated with the device 144a shown in FIGS. 5A and 5B are otherwise identical to those of device 144 shown in FIGS. 4A and 4B, and as such no further description will be provided.

Figure 6:
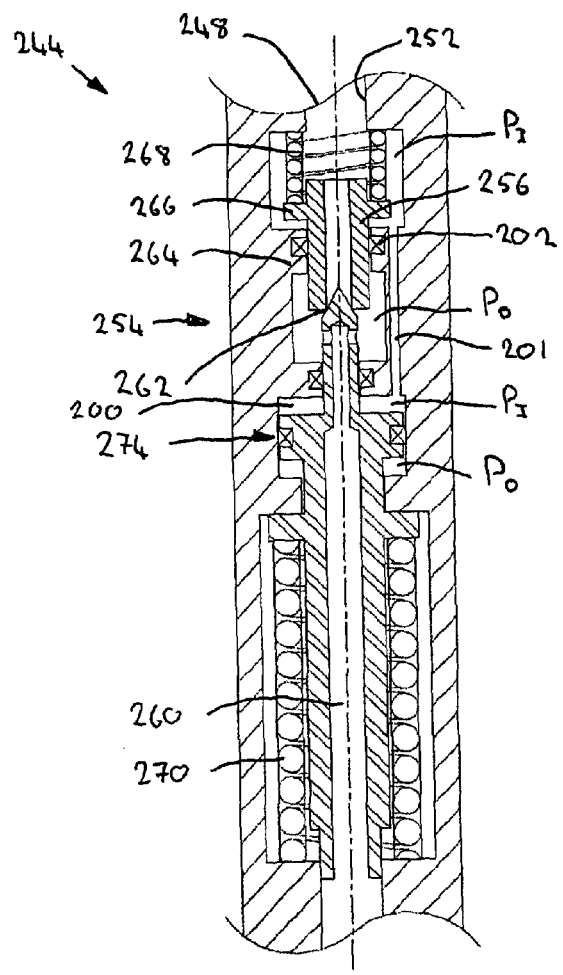
FIG. 6 provides a cross-sectional illustration of a portion of an injection device in accordance with a further embodiment of the present invention.

Reference is now made to FIG. 6 in which a further alternative embodiment of an injection device 244 is shown. Injection device 244 is similar to device 44 first shown in FIG. 3A and as such like components share like reference numerals, incremented by 200. Further, as the structure and operation of devices 244 and 44 are largely similar, only the differences will be highlighted. For example, although the device 244 includes first and second valve member 256, 258 which are engaged to define a seal area 262 to prevent flow along the flow path 252, the first valve member 256 defines a valve seat member, whereas the second valve member defines a valve body member. To accommodate such a modification over previously described embodiments some structural modifications are illustrated, such as the provision of a sealed space 200 which is in pressure communication with inlet pressure $P_I$ via pressure conduit 201, and the provision of a seal 202 which isolates inlet and outlet pressure $P_I$, $P_O$ across the first valve member 256.

Figure 7:
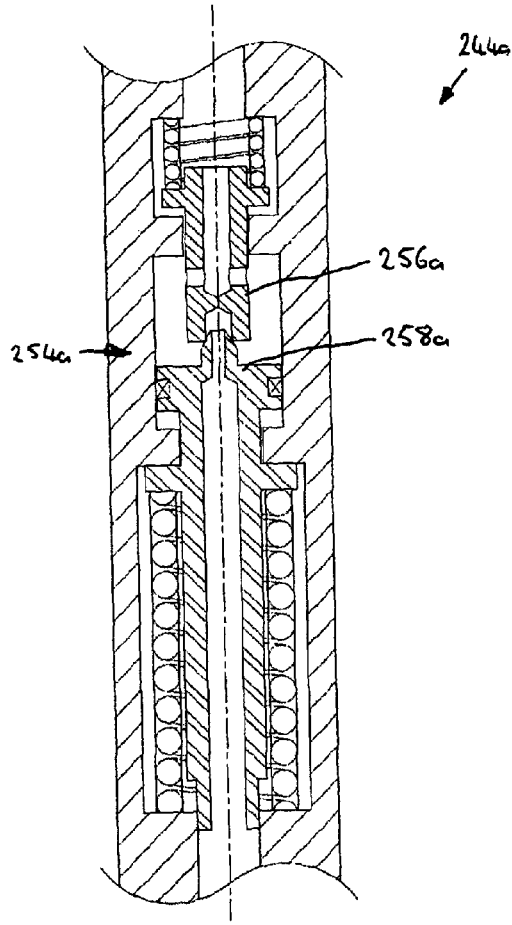
FIG. 7 provides a cross-sectional illustration of a portion of an injection device in accordance with a still further embodiment of the present invention.

FIG. 7 illustrates a portion of an injection device according to a further embodiment of the present invention. In this case the injection device, generally identified by reference number 244a, is very similar to device 244 of FIG. 6. However, the first and second valves members 256a, 256b are configured such that a separate pressure conduit (such as conduit 201 of device 244 in FIG. 6) is not required.

Figure 8:
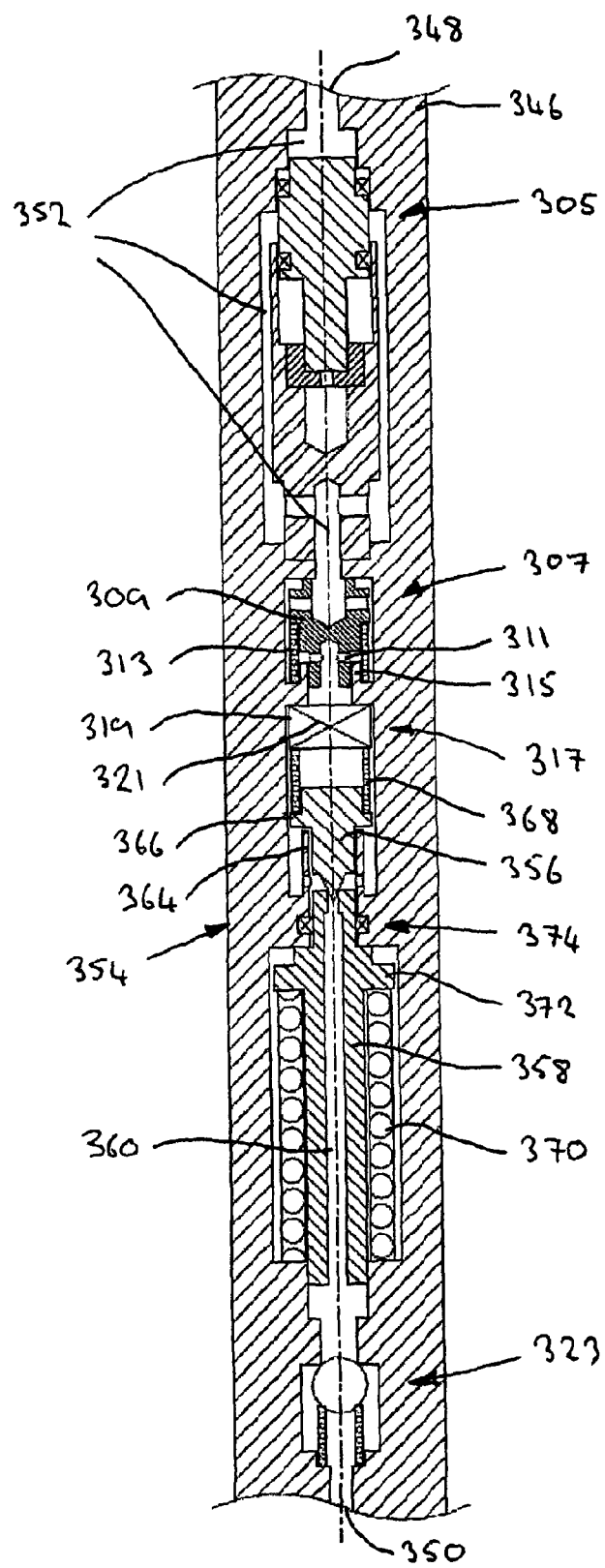
FIG. 8 provides a cross-sectional illustration of an injection device in accordance with another embodiment of the present invention.

A further alternative embodiment of an injection device, in this case generally identified by reference numeral 344, is shown in FIG. 8. Device 344 is similar to device 44 first shown in FIG. 3A and as such like features share like reference numerals incremented by 300. For purposes of brevity of the present description only the differences will be described. However, appropriate components have been labelled with appropriate reference numerals such that the similar features may be identified and understood accordingly.

Nevertheless, it is notable that in the present embodiment the device 344 includes a valve assembly 354 which includes first and second valve members 356, 358 which are engaged to prevent flow along the flow path 352 and disengaged to allow and regulate flow and pressure.

A rupture cartridge 305 is provided upstream of the valve assembly 354 and is configured to rupture and permit flow upon exposure to a threshold or rated inlet pressure. The rupture cartridge may be provided to isolate downstream components from the effects of pressure until commissioning, for example during deployment into a wellbore.

The device 344 also comprises a surge protection arrangement 307 located downstream of the rupture cartridge 305 but upstream of the valve assembly 354 (although this specific configuration is optional). The surge protection arrangement 307 provides protection within the device, for example to the valve assembly 354 from the effects of flow surges, as may be experienced upon rupture of the rupture cartridge 305.

The surge protection arrangement 307 includes a surge pin or body component 309 which includes a number of flow ports 311 which are open during normal flow. During a surge event the surge pin 309 is displaced downwards against the force of spring 313 such that the flow ports 311 become restricted by interaction with a sleeve 315. Following the surge event the spring 313 will act to return the surge pin 309 to its initial position thus again opening the ports 311.

The device 344 further comprises a filter arrangement 317 which is located downstream of the surge arrangement 307 and upstream of the valve assembly 354. The filter arrangement 317 includes a frame assembly 319 within which is mounted a filter screen 321 (although other filter media are possible, such as a mesh, porous element, sintered porous element, membrane or the like). During normal use the injection fluid flows through the screen 321 to be filtered, thus protecting the downstream valve assembly 354. However, if the filter screen 321 becomes clogged, then in order to prevent the device 344 from ceasing to function fully the frame assembly 319 is capable of being depressed, against the force of the spring 368 (which also acts on the first valve member 356), thus allowing flow bypass. Although filtering of the injection fluid will no longer be possible, this may permit the device 344 to continue operating until a the clogged filter 321 can be remedied or the requirements of injection have been achieved and are no longer required or accepted as being lost. More specifically, increasing inlet pressure caused by the clogged screen 321 (which defines a flow restriction and establishes a back pressure) will eventually displace the frame assembly 319 against the force of the spring 368. In another embodiment (which is not illustrated) the filter screen may be fixed relative to the housing. For example, no bypass functionality may be provided. Alternatively, the filter screen may be fixed relative to the housing and a separate displaceable member may be provided which is displaced in accordance with flow/pressure conditions to permit bypass of the fixed screen (or other filter media).

The device further comprises a check valve arrangement 323 which prevents reverse flow through the device 344.

It should be understood that the embodiments described herein are merely exemplary and that various modifications may be made thereto without departing from the scope of the invention. For example, one or more features form one embodiment may be utilised in any other embodiment. For example, at least one of the rupture cartridge 305, surge protection arrangement 307 and filter arrangement 317 may be used together or individually in any other embodiment.

The invention claimed is:

1. An injection device for use in injecting a fluid into a downhole target location, comprising:
 a housing defining an inlet for communicating with an injection line, an outlet for communicating with a downhole target location, and an injection fluid flow path extending between the inlet and outlet;
 a valve assembly located within the housing and configured to control the flow of injection fluid along the flow path, the valve assembly comprising first and second valve members both arranged to move within the housing;
a limiting arrangement configured to limit or restrict movement of the first valve member, the limiting arrangement including a limiting feature fixed relative to the housing and a corresponding limiting feature fixed relative to the first valve member;
wherein, in an open configuration to flow, the first and second valve members are disengaged, and in a closed configuration to prevent flow, the first and second valve members are engaged and the corresponding limiting features are of the limiting arrangement are separated such that the first valve member is biased against the second valve member by inlet fluid pressure to assist sealing therebetween.

2. The injection device according to claim 1, wherein the valve assembly is arranged to be opened when the pressure differential between inlet and outlet exceeds a predetermined value, and closed when the pressure differential between the inlet and outlet falls below a predetermined value.

3. The injection device according to claim 1, wherein the first and second valve members define a restriction to flow when disengaged to establish a back pressure in the inlet side assisting to maintain the inlet pressure above the outlet pressure.

4. The injection device according to claim 1, wherein the first valve member is located on an inlet side of the valve assembly, and the second valve member is located on an outlet side of the valve assembly.

5. The injection device according to claim 1, wherein the first and second valve members define a seal area at the region of engagement.

6. The injection device according to claim 5, wherein the seal area defined between the first and second valve members when engaged is exposed to inlet fluid pressure to establish a bias force acting on the first valve member.

7. The injection device according to claim 1, wherein the limiting arrangement is adapted to limit movement of the first valve member at a point of limitation and permit the second valve member to move beyond the point of limitation and to become disengaged from the first valve member.

8. The injection device according to claim 1, wherein the limiting arrangement comprise a land region configured to be engaged by the first valve member when at a point of limitation.

9. The injection device according to claim 1, wherein the second valve member defines an actuation member which is actuated to reconfigure the valve assembly between open and closed positions.

10. The injection device according to claim 1, wherein the second valve member comprises or defines a piston arrangement configured to be actuated by fluid pressure to move said second valve member.

11. The injection device according to claim 10, wherein the piston arrangement defines a sealing area exposed to inlet fluid pressure on one side and outlet fluid pressure on an opposing side.

12. The injection device according to claim 11, wherein the sealing area of the piston arrangement is larger than any seal area associated with the region of engagement between the first and second valve members.

13. The injection device according to claim 1, wherein the valve assembly comprises a biasing arrangement configured to bias the second valve member in a desired direction.

14. The injection device according to claim 13, wherein the biasing arrangement is selected to provide a desired biasing force selected to define a pressure differential between the inlet and outlet pressures.

15. The injection device according to claim 1, wherein one of the first and second valve members defines a valve seat member and the other of the first and second members defines a valve body member.

16. The injection device according to claim 1, comprising a pressure rated frangible arrangement configured to rupture upon exposure to a predetermined pressure.

17. The injection device according to claim 1, comprising a surge protection arrangement configured to provide protection against surging flow within or through the housing.

18. The injection device according to claim 17, wherein the surge protection arrangement comprises a component defining a flow path, wherein the flow path is restricted in the event of surging flow.

19. The injection device according to claim 1, comprising a filter arrangement configured to filter injection fluid.

20. The injection device according to claim 19, wherein the filter arrangement is adapted to facilitate fluid bypass in the event of clogging, thus permitting flow to be maintained.

21. The injection device according to claim 19, wherein the filter arrangement comprises a displaceable member which is displaceable to permit fluid bypass upon exposure to an inlet pressure which exceeds a predetermined value.

22. A method of controlling injection flow through an injection device between an injection line and a downhole target location, wherein the injection device includes a housing defining a flow path extending between an inlet and an outlet and a valve assembly comprising first and second moveable valve members located within the housing, the method comprising:
disengaging the first and second valve members to permit flow along the flow path; engaging the first and second valve members to prevent flow;
biasing the first valve member against the second valve member when engaged therewith with inlet fluid pressure to assist sealing between said members; and
defining a restriction to flow when the first and second valve members are disengaged to establish a back pressure in the inlet side assisting to maintain the inlet pressure above the outlet pressure.

23. An injection device for use in injecting a fluid into a downhole target location, comprising:
a housing defining an inlet for communicating with an injection line, an outlet for communicating with a downhole target location, and an injection fluid flow path extending between the inlet and outlet; and
a valve assembly located within the housing and configured to control the flow of injection fluid along the flow path,
wherein the valve assembly comprises first and second valve members configured to be engaged at a seal area to prevent flow and disengaged to permit flow, wherein at least one of the valve members defines a piston arrangement provided separately from the region of engagement between the first and second valve members and configured to be actuated by fluid pressure to move at least one of said valve members;
a limiting arrangement including a limiting feature fixed relative to the housing and a corresponding limiting feature fixed relative to the first valve member; and
wherein, when the first and second valve members are engaged to prevent flow, the corresponding limiting features are separated such that inlet fluid pressure acts over the seal area, thus forcing the first and second valve members together to assist sealing therebetween.

24. The injection device according to claim 23, wherein the piston arrangement is defined by a seal area associated with at least one of the first and second valve members.

25. The injection device according to claim 24, wherein the seal area is larger than any seal area associated with a region of engagement between the first and second valve members.

* * * * *